Feb. 18, 1969  W. F. SINDELAR  3,428,327
QUICK RELEASE ROTARY TOOL CHUCK
Filed Sept. 19, 1966
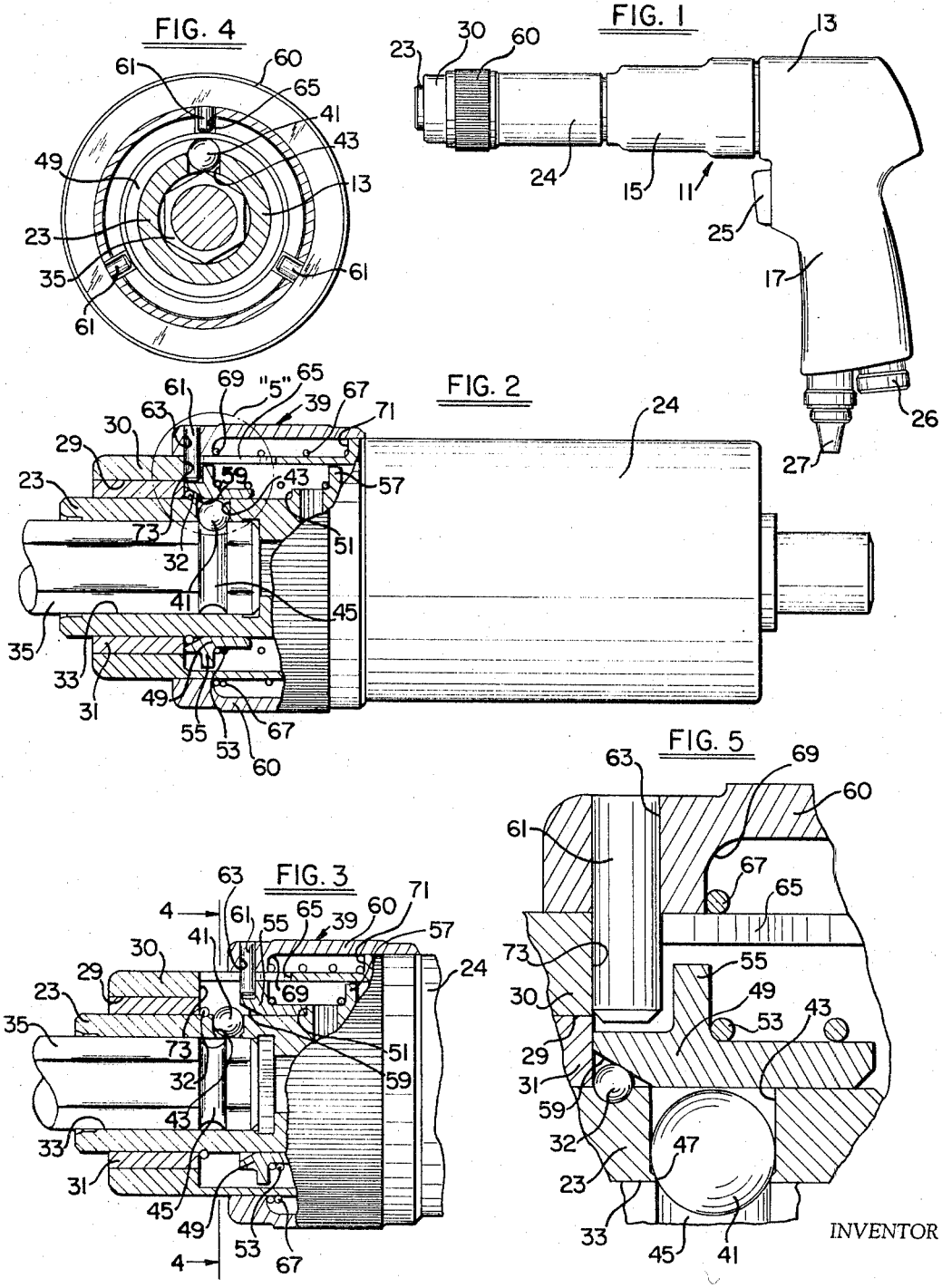
INVENTOR
WILLIAM F. SINDELAR
BY Joseph R. Slotnik
ATTORNEY United States Patent Office 3,428,327
Patented Feb. 18, 1969

3,428,327
QUICK RELEASE ROTARY TOOL CHUCK
William F. Sindelar, Towson, Md., assignor to The Black and Decker Manufacturing Company, Towson, Md., a corporation of Maryland
Filed Sept. 19, 1966, Ser. No. 580,368
U.S. Cl. 279—82     2 Claims
Int. Cl. B23b *31/12*

ABSTRACT OF THE DISCLOSURE

The device described herein is a portable, power driven, rotary tool which includes a housing having a motor therein adapted to rotate a spindle and a tool bit carried thereby. A quick-release chuck is provided to releasably secure the bit to the spindle and the latter is supported for accurate rotation in the housing.

---

This invention relates generally to tool holders, and particularly to an improved quick-release chuck for rotary tools.

An important object of the present invention is to provide an improved quick-release chuck for use with power driven rotary tools such as screw drivers and the like which provides for quick tool change and facilitates an axially compact, overall tool construction.

Additional important objects of the present invention are to provide an improved chuck of the above character which is adapted for use with a variety of different tool bits and which facilitates an improved sturdy tool output spindle supporting construction.

Further objects include the provision of an improved chuck of the above character which is relatively inexpensive to manufacture, durable in construction and safe and reliable in use.

Other objects and advantages of the present invention will become more apparent from a consideration of the following detailed description taken in conjunction with the drawings in which:

FIGURE 1 is a side elevational view illustrating a typical, power operated, rotary tool embodying the present invention;

FIGURE 2 is an enlarged view of the clutch and spindle housing used in the tool of FIGURE 1 and shown partly in section to illustrate a preferred form of chuck constructed to the present invention and shown with the chuck parts in the holding position;

FIGURE 3 is a view similar to FIGURE 2 but showing the chuck parts released;

FIGURE 4 is a sectional view of FIGURE 3 taken along the line 4—4 thereof; and

FIGURE 5 is an enlarged view of a portion of FIGURE 2 taken within the enclosure 5.

Broadly described, the present invention includes a power driver rotary tool, a housing, a spindle within said housing and adapted to be connected to a rotary power source, bearing means within said housing and rotatably supporting said spindle adjacent its forward end, said spindle forward end having a non-circular, tool bit receiving socket, ball detent means carried by said spindle behind said bearing means and movable radially of said spindle to cooperate with a noncircular tool bit portion nonrotatably supported in said socket to releasably hold said tool bit portion therein, retainer means on said spindle behind said bearing means and having a first portion slidably receiving said spindle and a cam portion tapered radially outwardly from said first portion, said retainer means being movable from a first position where said first portion overlays said ball detent means to a second position where at least a portion of said cam portion overlays said ball detent means, first resilient means normally biasing said retainer means toward said first position, actuator means slidably and nonrotatably disposed on said housing for movement from a first position disengaged from said retainer means to a second position engageable with and adapted to move said retainer means to its second position, and second resilient means normally biasing said actuator means toward its first position.

Referring now more specifically to the drawings, a typical power driven, rotary tool embodying the present invention is illustrated generally at 11 and is seen to be a pneumatically driven tool of the type adapted to rotatably drive a screw driver bit, impact wrench bit or the like. It is to be understood, however, that this particular tool is illustrated for exemplary purposes only and that the present invention is adapted for use with a broad range of tools including both pneumatically and electrically powered tools.

With this in mind, the tool 11 is seen to include a motor housing 13 having a gear case 15 projecting forwardly therefrom and a dependent pistol grip handle 17 integral therewith. A rotary pneumatic motor (not shown) is positioned within the motor housing 13 and is adapted to impart rotational movement to a tool spindle 23 through a transmission and clutch assembly (not shown) positioned in the gear case 15 and a barrel housing 24 respectively. Transmission and clutch assemblies of this type are well known in the art and for this reason need not be illustrated or described further here. A trigger 25 is provided on the handle 17 to control the flow of compressed air through a pneumatic conduit 26 to drive motor (not shown) and air is exhausted from the motor through a conduit 27. As is customary, the motor housing 13 and handle 17 together with the gear case 15 and barrel housing 24 may be constructed from a die cast aluminum alloy or other metals, or may be molded using a suitable glass fiber material.

As shown in FIGURES 2 and 3, the spindle 23 extends through an opening 29 in a reduced end 30 of the barrel housing 24 and is rotatably supported by a sleeve bearing 31 pressed therein. A retaining ring 32 is positioned on spindle 23 behind the bearing 31 to prevent the spindle 23 from pulling out of the housing 24.

The spindle 23 is provided with a socket-like opening 33 at its forward end adapted to receive a complementary shaped shank 35 formed on the end of a tool bit. For purposes of illustration, the socket 33 and the shank 35 are shown hexagonal in cross-sectional configuration although other forms may be used. In any event, the socket 33 and shank 35 are keyed together so that the spindle 23 and tool rotate conjointly about the longitudinal axis of the spindle upon energizing the motor (not shown).

According to this invention, a novel quick release tool chuck is provided to releasably hold the tool shank 35 and spindle 23 together. This chuck is illustrated generally at 39 in FIGURES 2 and 3 and is seen to include a detent ball 41 disposed in a radial opening 43 formed in the spindle 23 behind the bearing 31. The ball 41 is adapted to protrude into the socket opening 33 and be received in an annular groove 45 formed in the tool shank 35. Radial inward movement of the ball 41 is limited by an annular lip 47 on the spindle 23 so that the ball 41 will not fall into the socket 33.

A ball retainer 49 is slidably disposed on the spindle 23 and is adapted to overlay the radial opening 43. The retainer 49 is shown to have a sleeve-like configuration and is slidable between the bearing 31 and a radial shoulder 51 on the spindle 23. A compression spring 53 is caged between a radial flange 55 on the retainer 49 and a radial flange 57 on the spindle 23 and normally biases the retainer 49 forwardly or toward the left, as seen in FIGURE 2, to seat the retainer against the retaining ring 32. The retainer 49 has an outwardly tapered conical cam surface 59 at its forward end adapted to cooperate with the detent ball 41 and cam it inwardly into the socket opening 33 as the retainer 49 moves forwardly. When the retainer 49 is moved rearwardly or to the right, as seen in FIGURE 3, and abutted against the shoulder 51, the cam surface 59 partly overlies the spindle opening 43 so that in this position, the ball 41 can move radially outwardly sufficiently to permit withdrawal of the tool shank 35 from the socket 33. However, the ball 41 is prevented from coming completely out of the spindle opening 43 in this position by the cam surface 59.

To manipulate the retainer 49, there is provided an actuator collar 60 which is slidably disposed on the barrel housing 24. The actuator collar 60 is provided with at least one and preferably a plurality of pins 61 which are pressed into openings 63 in the actuator collar 60 and which extend radially into the barrel housing 24 through axially elongated slots 65 therein. The pins 61 are positioned to engage in front of the retainer flange 55, as shown in FIGURES 2, 3 and 5, so that by moving the collar 60 rearwardly or to the right, as seen in the figures, the retainer 49 also is moved in this direction. A compression spring 67 is caged between a radial flange 69 on the collar 60 and a radial shoulder 71 on the barrel housing 24 to normally bias the collar to the left as seen in FIGURE 2. Left-hand collar movement is limited by engagement of the pins 61 with a barrel housing shoulder 73 at the front of the slots 65.

In use, it will be seen that the springs 53, 67 normally hold the retainer 49 and the collar 60 in the positions shown in FIGURE 2 so that the tool shank 35 is securely held within the socket 33 by the detent ball 41. When it is desired to remove and/or replace the tool, all that is necessary is to pull back or toward the right on the acuator collar 60. Right-hand movement of the collar 60 causes right-hand movement of the retainer 49 through engagement of the retainer flange 55 by the pins 61. When the retainer 49 has been moved sufficiently far to the right, the ball 41 is partly uncovered so that it can move radially outwardly in the opening 43. At this point, the tool can be removed simply by pulling axially thereon, the shank groove 45 being sufficiently tapered so as to cam the ball 41 radially outwardly during tool removal.

Thereafter, a new tool can be assembled to the device simply by inserting the shank thereof into the socket opening 33. The collar 60 and retainer 49 are held rearwardly against their springs 67, 53 so that the shank of the new tool cams the ball 41 radially outwardly in the opening 43. When the shank groove on the new tool is aligned with the spindle opening 43, the actuator collar 60 is released. The compression springs 67, 53 return bias the collar 59, 60 and retainer 49 back toward the left and the retainer surface 59 cams the ball 41 into the tool shank groove 45 and holds it there.

In contrast to a number of prior art quick-release chuck devices of this type, the chuck 39 of the present invention provides that only the relatively short retainer 49 is mounted directly on the spindle 23. The actuator collar 60 is disposed on the barrel housing 24 and therefore does not contribute to the axial length of the spindle 23 required to accommodate axial movement of the chuck parts. Thus, only the short retainer 49 moves on the spindle 23 and this retainer requires only that spindle length between the bearing 31 and the shoulder 51.

Furthermore, the fact that the bearing 31 is forwardly of the chuck parts and adjacent the outer end of the spindle 23 contributes considerably to the stability of the spindle during use. Prior to this time, the spindle bearings employed with quick-release chucks were behind the chuck parts so that a substantial length of spindle was beyond the bearing and was unsupported.

Another feature of this construction resides in the fact that when the actuator collar 60 is in its forwardmost position, the pins 61 are free of contact with the ball retainer 49 which, in its forwardmost position, seats against the retaining ring 32. The retainer 49 tends to turn with the spindle 23 during rotation thereof but since axial and radial clearance exists between the retainer 49 and the collar pins 61, the collar 49 does not rub or otherwise wear the pins 61.

By the foregoing, there has been disclosed an improved, quick-release, tool chuck construction calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

I claim:

1. In a power driven rotary tool, a housing, a spindle within said housing and adapted to be connected to a rotary power source, bearing means within said housing and rotatably supporting said spindle adjacent its forward end, said spindle forward end having a noncircular, tool bit receiving socket, ball detent means carried by said spindle behind said bearing means and movable radially of said spindle to cooperate with a noncircular tool bit portion nonrotatably supported in said socket to releasably hold said tool bit portion therein, retainer means on said spindle behind said bearing means and having a first portion slidably receiving said spindle and a cam portion tapered radially outwardly from said first portion, said retainer means being movable from a first position where said first portion overlays said ball detent means to a second position where at least a portion of said cam portion overlays said ball detent means, first resilient means normally biasing said retainer means toward said first position, actuator means slidably and nonrotatably disposed on said housing for movement from a first position disengaged from said retainer means to a second position engageable with and adapted to move said retainer means to its second position, and second resilient means normally biasing said actuator means toward its first position.

2. A device as defined in claim 1 wherein said cam portion prevents complete withdrawal of said ball detent means from said spindle when said retainer means is in its second position.

References Cited

UNITED STATES PATENTS 2,008,894    7/1935    Bergstrom _____ 279—82 X
2,010,210    8/1935    Witt _____ 279—82

ROBERT C. RIORDAN, *Primary Examiner.*

J. C. PETERS, *Assistant Examiner.*